United States Patent Office 3,045,693
Patented July 24, 1962

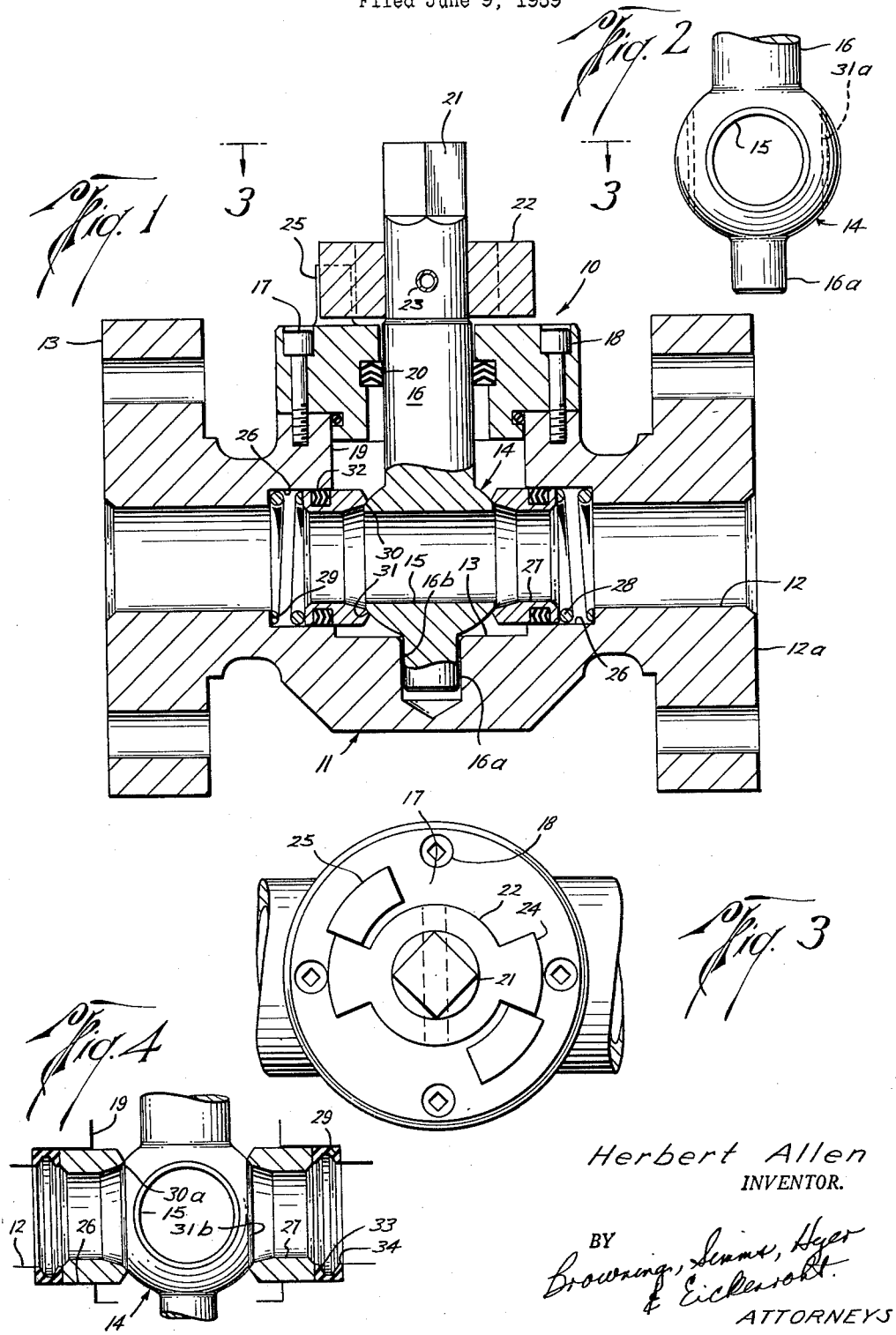

3,045,693
VALVES
Herbert Allen, Houston, Tex., assignor to
Cameron Iron Works, Inc.
Filed June 9, 1959, Ser. No. 819,109
1 Claim. (Cl. 137—315)

This invention relates generally to valves; and, more particularly, to improvements in ball-type rotary plug valves.

It is often necessary to remove a valve member from a valve body for replacement or repair. This is also true of the annular seats commonly carried within the body for sealing between the body and valve member in its closed position. In rotary plug valves having cylindrical or conical valve members, this is generally accomplished without breaking the connection of the valve body in the line by removal of a bonnet to uncover a side opening in the body of such size as to pass the valve member and seats.

However, ball-plug valves present a particular problem in this respect, because the inner ends of the seats engage annular seating surfaces on the valve member which have their outer diameters disposed outwardly of their inner diameters in directions axially away from the seats. That is, in its most common form, such a valve member has seating surfaces which are at least substantially spherical about a center lying within the axis of rotation of the valve member. Thus, when, as is preferred, the seats are of a relatively rigid material, the portions of the inner ends of the seats adjacent the opening in the body would ordinarily prevent the valve member from being moved therethrough.

An object of this invention is to provide a ball-type rotary plug valve in which the valve member as well as the relatively rigid seats engageable therewith are easily and quickly inserted into and removed from operative positions within the valve body without breaking its connection in the line.

A more particular object is to provide such a valve in which the valve member and the seats are so removed and inserted merely upon their passage through a side opening in the valve body.

These and other objects are accomplished, in accordance with the present invention, by a ball-type rotary plug valve in which the seats are urged inwardly into engagement with the aforementioned seating surfaces on the valve member by means which is outwardly yieldable an axial distance at least as great as the axial component of the seating surfaces, so that seats may be moved apart to permit movement of the valve member from between the seats and through a side opening in the valve body.

In accordance with another novel aspect of the invention, the seat is sealed with respect to the body to provide a pressure responsive surface on it which is exposed to upstream pressure, such that the seat engages the valve member with a pressure having a predetermined proportion to the upstream pressure. In one form of the invention, this means comprises a sliding seal between the seat and valve body, and a spring acting between the body and seat urges it into yieldable engagement with the valve member. In another form of the invention, this seal as well as the yieldable urging of the seat is provided by a ring of deformable sealing material disposed between the outer end of the seat and the body for sealing therebetween and providing a hydraulic force-transmitting connection between the upstream pressure in the flowway and the seat.

In the drawings, wherein like reference characters are used throughout to designate like parts:

FIG. 1 is a longitudinal sectional view of a valve constructed in accordance with the first-mentioned form of the present invention, and with the valve member thereof in open position;

FIG. 2 is a side view of the valve member shown in FIG. 1 removed from the valve body and turned 90° about its axis of rotation;

FIG. 3 is a top plan view of the valve of FIG. 1, as seen from broken line 3—3; and FIG. 4 is a partial sectional view of the valve constructed in accordance with the second-mentioned form of the invention, but with the valve member thereof in closed position.

Referring now particularly to FIG. 1 of the drawings, the valve 10 comprises a body 11 having a flowway 12 therethrough and flanged ends 12a for connection in a line. The flowway 12 is intersected by a chamber 13 within the valve body to receive a valve member 14 having an opening 15 therethrough. The opening 15 is arranged with its axis parallel to the axis of the flowway so that the valve member may be rotated about an axis transverse thereto between the open position of FIG. 1 and a closed position in which solid portions of the valve member on opposite sides of the openings are disposed across the flowway. The fluid controlled may flow into the valve body in either direction, such that the inlet and outlet thereto may comprise the portion of the flowway on either the left or right side of the chamber 13.

A stem or journal 16 on the valve member extends upwardly therefrom coaxially of its axis of rotation and through a bonnet 17 which is connected, as by bolts 18, across a side opening 19 through the body connecting the chamber 13 with the exterior thereof. As shown, the opening 19 is of such size as to permit the valve member 14 to be passed therethrough upon removal of the bonnet. A stem or journal 16a on the lower end of the valve member is coaxial with the stem 16 and is rotatably received within a well 16b in the body 11 to provide additional bearing for the valve member.

Chevron-type packing 20 is carried by the bonnet to form a sliding seal for the stem 16 during rotation of the valve member between opened and closed positions. The upper end of the stem projects above the top of the bonnet 17 and is provided with a non-circular part 21 to permit a tool to be applied thereto in rotating the valve member. The valve member is located in opened and closed positions by means of a collar 22 pinned at 23 to the stem intermediate the part 21 and top of the bonnet and having ears 24 which engage along their opposite sides with the opposite sides of stops 25 secured to the top of the bonnet. Obviously, other locating means may be employed.

Recesses 26 in the body extend axially outwardly from the chamber 13 and concentrically outwardly of the flowway on each side of the chamber to slidably receive seats 27 of metal or other relatively rigid material, which are obviously of a size to pass through the opening 19 for insertion into or removal from the recesses. More particularly, these recesses are of such length as to receive a compression type coil spring 28 between their ends 29 and the outer ends of the seats 27. Thus, the seats 14 are yieldably urged into engagement along their inner ends 30 with annular seating surfaces on the valve member 14.

In the open position of the valve member shown in FIG. 1, the annular seating surfaces 31 thereof surround the opening 15 therethrough on both sides of the valve member. In the valve illustrated, wherein the valve member rotates 90° between opened and closed positions, the annular seating surfaces will be formed on the solid portions of the valve member as it is rotated to closed position. As indicated by the broken lines at 31a in FIG. 2, these latter surfaces will also be coaxial of the flowway, and thus transverse to the axis of the seating surfaces 31.

As can be seen from FIG. 1, these inner ends of the seats are shaped correspondingly to the surfaces 31 and 31a so as to engage therewith over a predetermined area.

In any case, however, the outer diameters of these seating surfaces are disposed outwardly of their inner diameters thereof in a direction axially of the seats so that, as previously mentioned, the valve member is normally confined against radial movement from between the seats and through the opening 19. Although the substantial portion of the valve member is ball-shaped, its opposite sides about the intersection of opening 15 therewith are flattened out along planes transverse to the axis of opening 15 and coinciding with the inner diameter of seating surface 31, so that the inner diameters of the seating surfaces of the valve member define its maximum dimensions in its open position in a direction parallel to the axis of opening 15.

It will also be seen that each spring 28 is outwardly compressible a distance at least equal to the axial component of the seating surface engaged by the seat urged by the spring, such that movement of the valve member while in its open position in a direction axially of the opening 19 will force the seats 27 outwardly against the urging of the springs 28 beyond the inner diameters of the seating surfaces 31 to permit removal of the valve member, upon removal of the bonnet 17, for replacement and repair. Obviously, the valvet member may be returned to operative position between the seats by a reversal of this procedure.

Chevron-type packing 32 or other suitable means received within a groove about the outer surfaces of the seats 27 provide a sliding seal with the recess 26 during reciprocation of the seats. Thus, as the valve member is moved to closed position, the pressure of the fluid in the inlet or upon the upstream side of the valve member will be effective across an annular area of the upstream seat defined between its outer diameter and the inner diameter of its inner end 30. The force due to this pressure will thus supplement the urging of the upstream spring 28 to maintain the inner end 30 of the seat in sealing engagement with the valve member 14. At the same time, the spring 28 on the downstream side will maintain a bias upon the opposite side of the valve member.

More particularly, the inner end 30 of each of the seats 27 is of a lesser area than the aforementioned effective area upon which the upstream pressure acts. In this manner, the seats will always be engaged with the closed valve member with a greater unit pressure than that of the upstream pressure being controlled.

The second form of valve may correspond in all respects to that of FIGS. 1 to 3 except for certain parts thereof shown in FIG. 4. Thus, with reference to the latter, an annular ring 33 of deformable sealing material, such as rubber, and having inwardly extending lips 34 is disposed between the outer end of each of the seats 27 and the end 29 of its recess 26. The lips normally flare outwardly to form an interference type seal with each such end as the ring is placed therebetween. Thus, in the closed position of the valve member 14 shown in FIG. 4, upstream pressure is effective over the same idea of the seat described above in connection with FIG. 1. That is, the pressure within the deformable material of this ring 33 will be substantially the same as the upstream pressure such that the ring will act in a hydraulic manner to urge the seat inwardly with a corresponding pressure.

At the same time, this ring is yieldable in a direction axially outwardly of the flowway 12 of the valve body as well as its own axis for a distance at least as great as the axial components of the seating surfaces on the valve member and surrounding the opening 15 therethrough with which the inner ends 30a of the seats are engageable in the closed position of the valve member. Thus, the valve member is insertable and removable in the same manner as described in connection with FIG. 1.

As distinguished from the valve member of the form of FIGS. 1 to 3, the solid portions on opposite sides of the opening 15 through the valve member 14 of FIG. 4 are also flattened off, in this case along planes parallel to the axis of the opening 15. Also, these planes coincide with the inner diameter of seating surfaces 31b with which the inner ends 30a of the seats engage in the closed position of the valve member. Thus, the inner diameters of the seating surfaces 31b define the maximum dimension of the valve member in its closed position in a direction parallel to the flowway 12 of the valve body. Since these components are substantially equal to those of the seating surfaces surrounding the flowway, as shown at 31 in FIG. 1, the valve member will also be insertable and removable in this form of the invention in its closed position, as shown FIG. 4.

Furthermore, the seating surfaces 31b as well as the inner ends 30a of the seats 27 are conically shaped so as to simplify the machining process involved in forming them. As shown, these conical surfaces are formed on only the seating surfaces on the solid portions of the ball valve member since it is only in the closed position thereof that a seal is necessary. As in the case of the valve member of the first-described form, the inner ends 30a will engage the seating surfaces 31b over a predetermined annular area which is smaller than the effective area against which upstream pressure acts to urge the upstream seat inwardly. Thus, the sealing engagement between the upstream seat and the valve member is always at a greater pressure than that of the fluid being controlled. If desired, the inner edges of these conical surfaces 31a may be rounded slightly to provide a smoother transition into the remaining spherical surfaces of the ball valve member.

From the foregoing it will be seen that this invention is one well aadpted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

A ball-type rotary plug valve, comprising a body having a flowway therethrough and a chamber therein intersecting the flowway, a valve member having an opening therethrough and mounted within the chamber for rotation between positions opening and closing the flowway, recesses within the valve body extending outwardly of the chamber axially of the flowway, substantially rigid annular seats axially slidable within the recesses, an opening through the side of the valve body connecting the chamber therein with the exterior thereof for passing the valve member and the seats, said valve member having oppositely disposed journals thereon, a bonnet removably connected to the valve body to close the side opening and having a bearing therein to receive one journal, a bearing in the chamber of the valve body opposite said opening to receive the other journal, and a ring of deformable sealing material sealingly engaging between the body, the end of each recess, and the outer end of each seat received therein and urging the inner end of said seat into engagement with annular seating surfaces on the valve member in the opened and closed positions thereof, each of said seating surfaces having an outer diameter extending outwardly of its inner diameter in a direction axially away from its associated seat, and each ring being compressible axially outwardly a distance at least as great as the axial component of the seating surface engaged by the seat urged by said ring in the open position of the valve member, each opposite side of the valve member being flattened out about its intersection with the opening therethrough and along a plane transverse to the axis of said opening and coinciding with said inner diameter of the seating surfaces on said side of the valve member.

References Cited in the file of this patent

UNITED STATES PATENTS

| | | |
|---|---|---|
| 2,548,128 | Snyder | Apr. 10, 1951 |
| 2,558,260 | Maky | June 26, 1951 |
| 2,796,230 | Grove | June 18, 1957 |
| 2,868,498 | Kaiser | Jan. 13, 1959 |

FOREIGN PATENTS

| | | |
|---|---|---|
| 166,481 | Great Britain | of 1921 |